United States Patent
Suzuki et al.

(10) Patent No.: US 10,020,707 B2
(45) Date of Patent: Jul. 10, 2018

(54) MOTOR DRIVEN COMPRESSOR

(71) Applicant: KABUSHIKI KAISHA TOYOTA JIDOSHOKKI, Kariya-shi (JP)

(72) Inventors: Koki Suzuki, Kariya (JP); Fumihiro Kagawa, Kariya (JP); Takao Kawasaki, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 222 days.

(21) Appl. No.: 15/049,212

(22) Filed: Feb. 22, 2016

(65) Prior Publication Data
US 2016/0254723 A1 Sep. 1, 2016

(30) Foreign Application Priority Data

Feb. 27, 2015 (JP) ................. 2015-038823

(51) Int. Cl.
*H02K 5/22* (2006.01)
*H02K 11/33* (2016.01)
(Continued)

(52) U.S. Cl.
CPC ............. *H02K 5/225* (2013.01); *F25B 31/02* (2013.01); *H02K 11/01* (2016.01); *H02K 11/022* (2013.01);
(Continued)

(58) Field of Classification Search
CPC ........ H02K 5/225; H02K 11/01; H02K 11/33; H02K 11/022
See application file for complete search history.

(56) References Cited

U.S. PATENT DOCUMENTS

| 6,670,733 | B2 * | 12/2003 | Melfi | H02K 11/01 310/68 R |
| 7,365,458 | B2 * | 4/2008 | Yoshida | H02K 11/40 310/68 R |

(Continued)

FOREIGN PATENT DOCUMENTS

| JP | H06-204718 A | 7/1994 |
| JP | 2002-281765 A | 9/2002 |

(Continued)

OTHER PUBLICATIONS

Communication dated Mar. 14, 2017, issued from the Japan Patent Office in corresponding Japanese Application No. 2015-038823.

*Primary Examiner* — Dang Le
(74) *Attorney, Agent, or Firm* — Sughrue Mion, PLLC

(57) ABSTRACT

A motor-driven compressor includes a housing, a compression portion, and an electric motor, a drive circuit, a circuit housing, a control circuit, a communication lead, and a metal shielding member. The compression portion and the electric motor are received in the housing. The circuit housing is arranged outside the housing and defines an accommodation chamber that receives the drive circuit. The control circuit is configured to control the electric motor by controlling the drive circuit. The communication lead is connected to the control circuit and drawn from the inside to the outside of the accommodation chamber. The metal shielding member is arranged in the accommodation chamber and covers the communication lead. The circuit housing includes a metal shielding portion, which is electrically grounded. The shielding member is electrically connected to the shielding portion.

12 Claims, 3 Drawing Sheets

(51) Int. Cl.
*H02K 11/01* (2016.01)
*H02K 11/22* (2016.01)
*F25B 31/02* (2006.01)

(52) U.S. Cl.
CPC ........ *H02K 11/33* (2016.01); *F25B 2400/077* (2013.01)

(56) References Cited

U.S. PATENT DOCUMENTS

| | | | |
|---|---|---|---|
| 9,343,940 B2 * | 5/2016 | Fukasaku | H02K 5/22 |
| 2002/0073729 A1 * | 6/2002 | Shibuya | F04C 23/008 62/505 |
| 2010/0181876 A1 | 7/2010 | Watanabe et al. | |

FOREIGN PATENT DOCUMENTS

| | | |
|---|---|---|
| JP | 2006-050685 A | 2/2006 |
| JP | 2009-127523 A | 6/2009 |
| JP | 2010-112261 A | 5/2010 |

* cited by examiner

MOTOR DRIVEN COMPRESSOR

BACKGROUND OF THE INVENTION

The present invention relates to a motor-driven compressor including a drive circuit, a control circuit, and a communication lead connected to the control circuit.

For example, Japanese Laid-Open Patent Publication No. 2010-112261 discloses a motor-driven compressor that includes a compression portion for compressing refrigerant, an electric motor for driving the compression portion, and a housing, which receives the compression portion and the electric motor. The motor-driven compressor further includes a drive circuit for driving the electric motor. The drive circuit is received in an accommodation space provided in the motor-driven compressor. The drive circuit includes a high voltage circuit for driving the motor and a low voltage circuit for control. In general, the low voltage circuit for control is connected to a communication lead, which is drawn from the inside to the outside of the accommodation space and connected to an external control device for controlling the motor-driven compressor.

The motor-driving high voltage circuit (a power switching element) may release electromagnetic noise to the surroundings in intensity large enough to affect other electric components. Such electromagnetic noise is easily propagated to electric components on the low voltage side. When the electromagnetic noise is propagated to a communication lead on the low voltage side, the electromagnetic noise may be further propagated to the external control device, which is connected to the communication lead. Reduction of the electromagnetic noise propagated to the communication lead is thus desired.

SUMMARY OF THE INVENTION

An objective of the present invention is to provide a motor-driven compressor in which electromagnetic noise propagated to a communication lead is reduced.

To resolve the above problem, a motor-driven compressor includes a housing in which refrigerant is drawn, a compression portion that is received in the housing and compresses and discharges the refrigerant, an electric motor that is received in the housing and drives the compression portion, a drive circuit that drives the electric motor, a circuit housing that is arranged outside the housing and defines an accommodation chamber that receives the drive circuit, a control circuit configured to control the electric motor by controlling the drive circuit, a communication lead that is connected to the control circuit and drawn from the inside to the outside of the accommodation chamber, and a metal shielding member that is arranged in the accommodation chamber and covers the communication lead. The circuit housing includes a metal shielding portion, which is electrically grounded. The shielding member is electrically connected to the shielding portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A motor-driven compressor 10 according to one embodiment will now be described with reference to FIGS. 1 to 4. The motor-driven compressor 10 according to the present embodiment is used in a heat pump 100 of, for example, an air conditioner installed in a vehicle.

Figure 1:
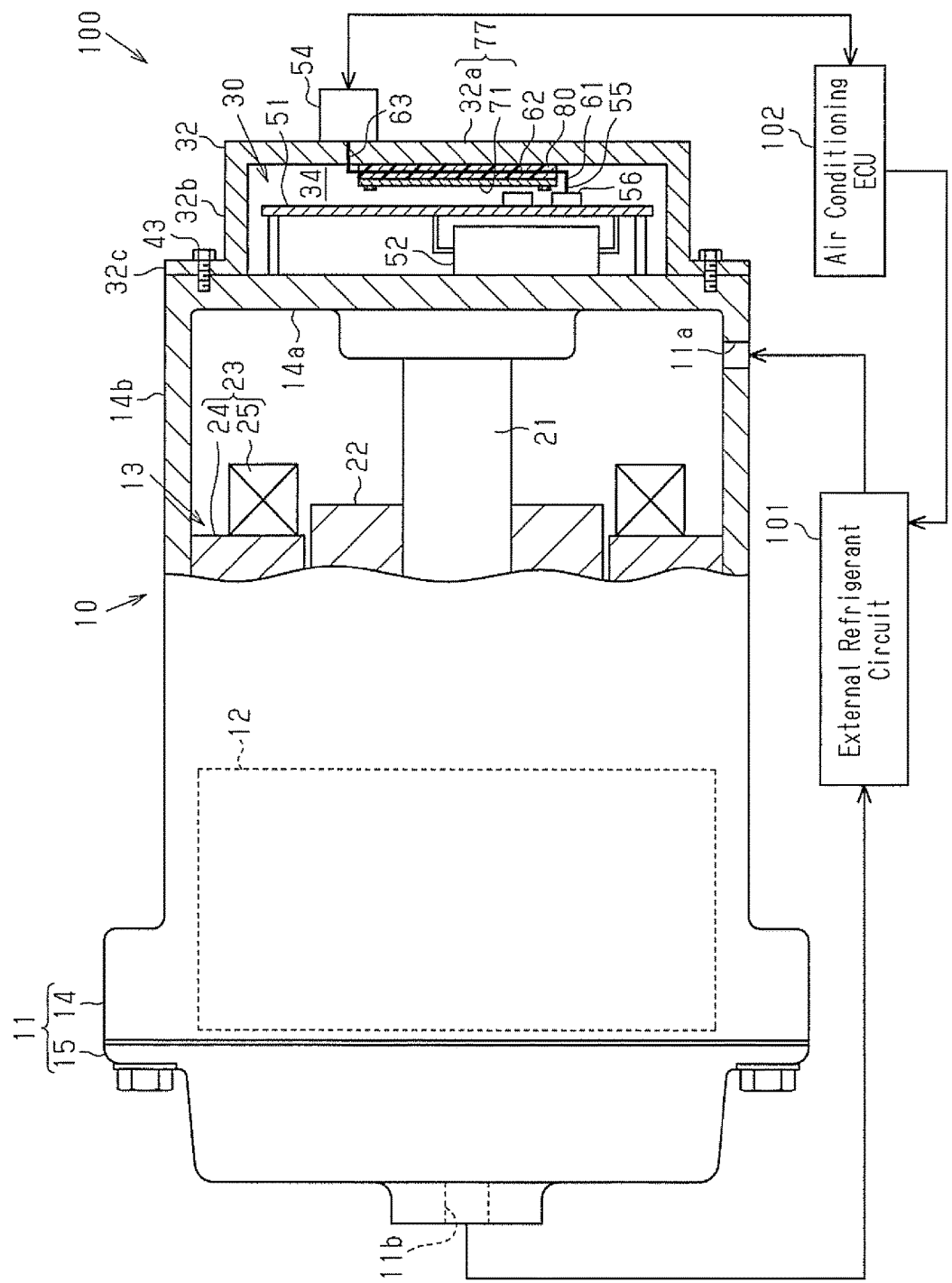
FIG. 1 is a schematic diagram of a motor-driven compressor according to one embodiment, which constitutes a part of a heat pump.

As shown in FIG. 1, the heat pump 100 includes a motor-driven compressor 10 and an external refrigerant circuit 101, which supplies refrigerant to the motor-driven compressor 10. The external refrigerant circuit 101 includes, for example, a heat exchanger and an expansion valve. The heat pump 100 performs cooling and heating of the passenger compartment in the vehicle by compressing refrigerant by the motor-driven compressor 10 and performing heat exchange and expansion of refrigerant by the external refrigerant circuit 101. The heat pump 100 includes an air conditioning ECU 102, which controls the entire heat pump 100. The air conditioning ECU 102 is an external control device, which is provided outside the motor-driven compressor 10. The air conditioning ECU 102 is a control circuit or processor including a computer. The air conditioning ECU 102 is configured to obtain the temperature in the passenger compartment and a temperature setting target and transmits various kinds of control signals such as an ON/OFF command and a rotation speed command to the motor-driven compressor 10 based on these parameters (the obtained temperatures).

The motor-driven compressor 10 includes a housing 11, a compression portion 12, and an electric motor 13. The housing 11 receives the compression portion 12 and the electric motor 13. The housing 11 has one open end in the axial direction. The housing 11 includes a first housing constituent 14 having one open end in the axial direction and a bottom wall 14a, and a second housing constituent 15, which is joined to the open end of the first housing constituent 14 and closes the opening of the first housing constituent 14. That is, the first housing constituent 14 includes a tubular side wall 14b, which extends from the bottom wall 14a. The housing 11 is made of metal such as aluminum, for example. The motor-driven compressor 10 includes an inlet 11a in the side wall 14b of the first housing constituent 14 and an outlet 11b in the second housing constituent 15. Refrigerant is drawn in from the external refrigerant circuit 101 through the inlet 11a and is discharged to the heat pump 100 through the outlet 11b.

The compression portion 12 compresses the refrigerant that is drawn in the housing 11 through the inlet 11a and discharges the compressed refrigerant through the outlet 11b. The specific structure of the compression portion 12 may be any structure such as a scroll type, a piston type, or a vane type.

The electric motor 13 drives the compression portion 12. The electric motor 13 includes, for example, a columnar rotary shaft 21, which is rotationally supported by the housing 11, a hollow cylindrical rotor 22, which is fixed to the rotary shaft 21, and a stator 23, which is fixed to the housing 11. The stator 23 includes a hollow cylindrical stator core 24 and a coil 25 that is wound around the teeth of the stator core 24. The rotor 22 faces the stator 23 in the radial direction of the rotary shaft 21.

The motor-driven compressor 10 includes an inverter 30 as a drive circuit for driving the electric motor 13. The inverter 30 is connected to the coil 25 of the electric motor 13 with a connector and the like (not shown). The motor-driven compressor 10 includes a circuit housing 32 outside the housing 11. The circuit housing 32 defines an accommodation chamber 34, which receives the inverter 30. In particular, the circuit housing 32 is coupled to the bottom wall 14a of the first housing constituent 14 in the housing 11.

The circuit housing 32 is made of metal such as aluminum, for example, and has a tubular shape with one closed end. The circuit housing 32 includes a bottom 32a, a circumferential wall 32b, and a flange 32c. The bottom 32a is spaced from the bottom wall 14a in the axial direction of the housing 11 and faces the bottom wall 14a. The circumferential wall 32b extends from the circumferential edge of the bottom 32a. The flange 32c extends circumferentially about and radially outward from the open end of the circumferential wall 32b. The circuit housing 32 is fixed to the housing 11 by inserting fasteners 43 (e.g., bolts) through the flange 32c and screwing the fasteners 43 to the bottom wall 14a. The accommodation chamber 34 is configured by the space that is sealed by the circuit housing 32 and the bottom wall 14a of the housing 11. The housing 11 is electrically grounded, so that the circuit housing 32, which is electrically connected to the housing 11, is also electrically grounded.

Figure 3:
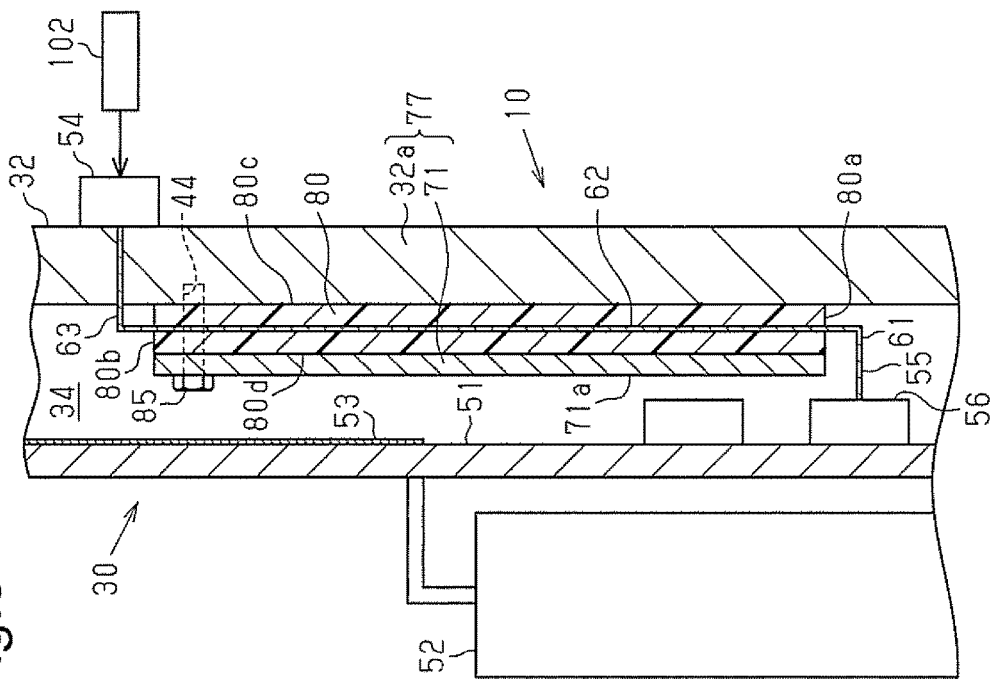
FIG. 3 is a longitudinal cross-sectional view of the inverter of FIG. 2.

As shown in FIG. 3, the inverter 30 includes, for example, a circuit board 51, which is fixed to the housing 11, and a power module 52, which is electrically connected to the circuit board 51. The power module 52 functions as a high voltage circuit. The power module 52 includes power switching elements (not shown). An implementation lead 53 is provided on the circuit board 51 to connect components. Signals or electric power is delivered through the implementation lead 53. The motor-driven compressor 10 includes a control circuit 56, which is a circuit that controls the power module 52 and is a circuit with lower voltage than the power module 52. The control circuit 56 is implemented on the circuit board 51.

The motor-driven compressor 10 includes bus bars 55 as a communication lead. The bus bars 55 according to the present embodiment are shaped like plates. The bus bars 55 electrically connect the control circuit 56 to the air conditioning ECU 102 via a connector 54, which is arranged on the bottom 32a of the circuit housing 32. The bus bars 55 are drawn from the inside to the outside of the accommodation chamber 34. The control circuit 56 receives control signals from the air conditioning ECU 102 through the bus bars 55. The control circuit 56 outputs the received control signals to the power module 52 to control the power module 52. In the accommodation chamber 34, the bus bars 55 are arranged on the opposite side of the circuit board 51 from the power module 52. The bus bars 55 are arranged between the bottom 32a of the circuit housing 32 and the power module 52. The bus bars 55 receive low voltage in comparison with high voltage components such as a power switching element of the power module 52.

The bus bars 55 are bent. Each of the bus bars 55 includes a first raised portion 61, an extension portion 62, and a second raised portion 63. The first raised portion 61 extends from the control circuit 56 on the circuit board 51 toward the bottom 32a of the circuit housing 32. The extension portion 62 continuously extends from the first raised portion 61 and extends along the bottom 32a of the circuit housing 32. The second raised portion 63 continuously extends from the extension portion 62 outward of the bottom 32a. In the present embodiment, the number of the bus bars 55 is two. However, the number of the bus bars 55 may vary.

Figure 2:
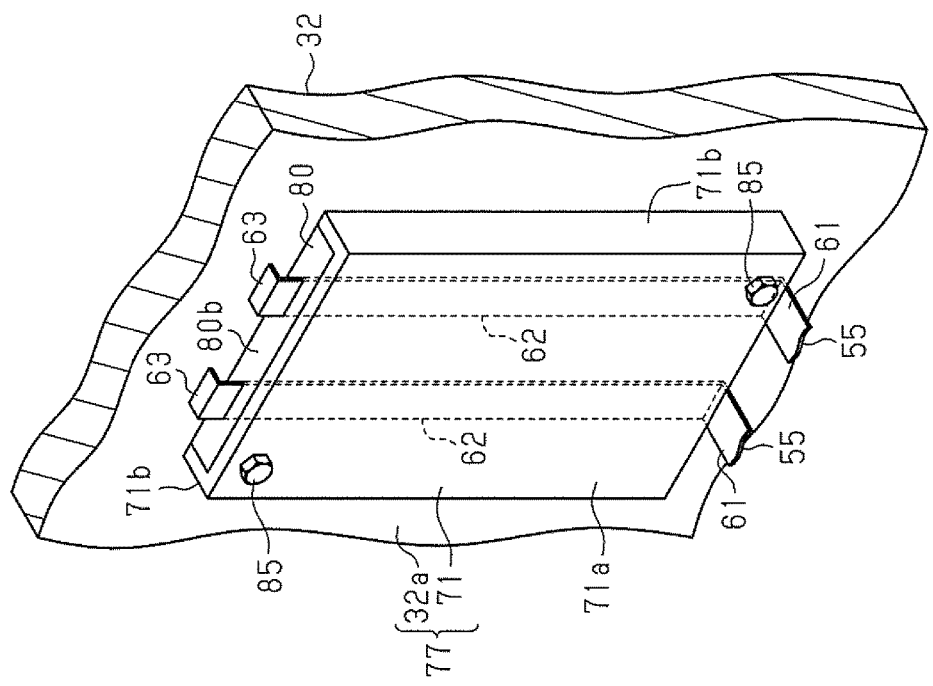
FIG. 2 is a partial perspective view illustrating a shielding member and bus bars arranged in the accommodation chamber of the motor-driven compressor shown in FIG. 1.

As shown in FIG. 2, the two bus bars 55 are integrated with a plastic portion 80 by molding a plastic material. The plastic portion 80 covers most of the four side faces of the extension portion 62 in each of the bus bars 55. The four side faces of the extension portion 62 are two first faces that face in the thickness direction of the extension portion 62 and two second faces that extend between the first faces. Thus, the extension portion 62 passes through the plastic portion 80 in the longitudinal direction, and the plastic portion 80 surrounds the four side faces of the extension portion 62, i.e., surrounds the extension portion 62 from the four directions. In other words, the plastic portion 80 entirely surrounds the extension portion 62 from the sides. The plastic portion 80 holds the two bus bars 55 in a state in which the bus bars 55 are parallel to and spaced from each other so that the bus bars 55 are insulated from each other.

Figure 4:
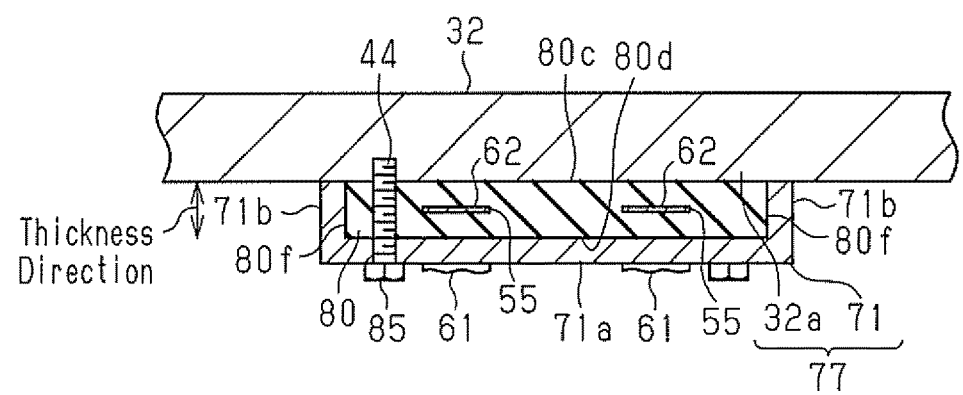
FIG. 4 is a transverse cross-sectional view of the inverter of FIG. 2.

As shown in FIGS. 2 to 4, the plastic portion 80 includes a first end face 80a at one end in the longitudinal direction and a second end face 80b at the other end in the longitudinal direction. The plastic portion 80 further includes a third end face 80c that extends between the longitudinal ends, which are the first end face 80a and the second end face 80b. The third end face 80c extends along the bottom 32a of the circuit housing 32 and contacts the bottom 32a. The plastic portion 80 also includes a fourth end face 80d that extends between the first end face 80a and the second end face 80b. The fourth end face 80d faces in the opposite direction from the third end face 80c and is closer to the circuit board 51 than the third end face 80c. As shown in FIG. 4, the direction in which the third end face 80c and the fourth end face 80d are arranged in the plastic portion 80 is defined as a thickness direction. The plastic portion 80 includes a pair of fifth end faces 80f. The fifth end faces 80f extend between the third end face 80c and the fourth end face 80d in the thickness direction other than the first end face 80a and the second end face 80b.

In each of the bus bars 55, the end of the extension portion 62 that is connected to the first raised portion 61 protrudes from the first end face 80a of the plastic portion 80. In each of the bus bars 55, the end of the extension portion 62 that is connected to the second raised portion 63 protrudes from the second end face 80b of the plastic portion 80. The control circuit 56 is arranged near the first end face 80a to shorten the length of the first raised portion 61. Most of the second raised portion 63 is arranged in the through hole and the connector 54, which are provided in the bottom 32a, and the end of the second raised portion 63 that is connected to the extension portion 62 is exposed in the accommodation chamber 34.

The motor-driven compressor 10 is structured to reduce electromagnetic noise, which is released from the power module 52 and propagated to the bus bars 55. The structure will now be described.

As shown in FIGS. 2 to 4, the motor-driven compressor 10 includes a shielding member 71, which is made of, for example, metal such as iron. The shielding member 71 suppresses the propagation of electromagnetic noise from the power module 52 to the bus bars 55. The shielding member 71 has a U-shaped cross-section that is perpendicular to the longitudinal direction of the extension portion 62. The shielding member 71 includes a rectangular plate-shaped body 71a and plate-shaped side walls 71b, which extend from the long edges, which are edges in the transverse direction of the body 71a. The body 71a and the side walls 71b are integrally formed.

The body 71a covers the fourth end face 80d of the plastic portion 80 from the outside, and the side walls 71b cover the fifth end faces 80f from the outside. In other words, the shielding member 71, which is arranged between the power module 52 and the bus bars 55, covers the bus bars 55, which are integrated with the plastic portion 80, inside the accommodation chamber 34. The plastic portion 80 insulates the bus bars 55 from the shielding member 71.

The ends of the side walls 71b that are located on the opposite side from the body 71a (the distal ends of the side walls 71b) are in contact with the bottom 32a of the circuit housing 32. The shielding member 71 and a part of the bottom 32a surround the four faces of the plastic portion 80 (the third end face 80c, the fourth end face 80d, and the fifth end faces 80f) without a gap. A tubular shield 77 is formed with the bottom 32a of the circuit housing 32 and the shielding member 71 to surround the bus bars 55. "Surrounding the bus bars 55" refers to entirely surrounding the bus bars 55 from the sides.

Since the whole circuit housing 32 is made of metal in the present embodiment, the bottom 32a of the circuit housing 32 functions as a shielding portion. The bottom 32a of the circuit housing 32 is arranged to face the extension portion 62 of the bus bars 55 with the plastic portion 80 in between.

In each of the bus bars 55, only the end of the extension portion 62 that is connected to the first raised portion 61, the first raised portion 61, the end of the extension portion 62 that is connected to the second raised portion 63, and the end of the second raised portion 63 that is connected to the extension portion 62 are exposed inside the accommodation chamber 34. Thus, most of each bus bar 55 is covered by the shield 77, the bottom 32a, and the connector 54.

Fixing bolts 85, which are made of metal such as iron, extend through the shielding member 71 and the plastic portion 80. The fixing bolts 85 are screwed into internal thread holes 44, which are formed in the bottom 32a. The plastic portion 80, which holds the bus bars 55, is fastened to the bottom 32a together with the shielding member 71 by screwing the fixing bolts 85 to the bottom 32a. In addition, the fixing bolts 85 electrically connect the shielding member 71 to the bottom 32a of the circuit housing 32. Thus, the voltage of the shielding member 71 is equal to the voltage of the bottom 32a. In the shielding member 71, the distal ends of the side walls 71b contact the bottom 32a, and the shielding member 71 is electrically connected to the bottom 32a.

Operation of the motor-driven compressor 10 will now be described.

The electric motor 13 of the motor-driven compressor 10 is driven by the inverter 30. Although electromagnetic noise is produced by the power module 52 of the inverter 30, the shield 77, which is configured with the shielding member 71 and the bottom 32a of the circuit housing 32, blocks the electromagnetic noise.

The above illustrated embodiment achieves the following advantages.

(1) Inside the accommodation chamber 34, the bus bars 55 are covered by the tubular shield 77, which is formed with the shielding member 71 and the bottom 32a as a shielding portion of the circuit housing 32. Thus, most of the outer surface of the bus bars 55 is entirely surrounded by the shield 77. Thus, the shield 77 blocks electromagnetic noise that is produced by the power module 52 in the accommodation chamber 34, thereby reducing the electromagnetic noise propagated to the bus bars 55. Accordingly, electromagnetic noise propagated to the air conditioning ECU 102 through the bus bars 55 is reduced.

The bottom 32a, which is a part of the shield 77, is configured with a part of the circuit housing 32. Thus, the circuit housing 32 may also function as a part of the structure for reducing electromagnetic noise propagated to the bus bars 55. This limits the increase of the number of components so that manufacturing costs are reduced.

(2) The circuit housing 32 is made of metal. Thus, the bottom 32a (a shielding portion) is electrically connected to the shielding member 71 simply by fastening the shielding member 71 to the bottom 32a of the circuit housing 32 with the metal fixing bolts 85. This facilitates electrically connecting the shielding member 71 and the bottom 32a, and the shield 77 is easily formed.

(3) The bus bars 55 are integrated with the plastic portion 80 by molding. The bus bars 55 with the shielding member 71, which covers the plastic portion 80, are fastened to the bottom 32a of the circuit housing 32 with the fixing bolts 85. Thus, the shielding member 71 is capable of receiving the axial force of the fixing bolts 85 to limit damage to the plastic portion 80.

(4) The bus bars 55 are integrated with the plastic portion 80 by molding. Thus, the plastic portion 80 is capable of holding the bus bars 55. Moreover, the plastic portion 80 with the shielding member 71 is fastened to the circuit housing 32 with the fixing bolts 85. This allows the plastic portion 80 to absorb vibration produced in the motor-driven compressor 10 so that the vibration is not easily propagated to the bus bars 55.

(5) The shield 77 covers the bus bars 55 from the inside of the accommodation chamber 34. Thus, even though the bus bars 55 are present in the accommodation chamber 34, the electromagnetic noise propagated to the bus bars 55 is reduced. This eliminates complicated arrangement of the bus bars 55 in the accommodation chamber 34 for blocking propagation of electromagnetic noise to the bus bars 55.

(6) The shielding member 71, which is a part of the constituent component of the shield 77, includes the body 71a and the side walls 71b. The body 71a covers the bus bars 55, which is arranged to face the bottom 32a, from the opposite side from the bottom 32a. The side walls 71b extend from the body 71a toward the bottom 32a, and the distal ends of the side walls 71b are in contact with the bottom 32a. This electrically connects the shielding member 71 to the bottom 32a. Accordingly, the tubular shield 77 is formed with the shielding member 71 and the bottom 32a, and it is possible for the shield 77 to surround the entire circumference of the bus bars 55.

The above-illustrated embodiment may be modified in the following manners.

The communication lead is not limited to the bus bars 55, which are made of metal and shaped like a plate. The communication lead may be a lead wire. The bus bars 55 may be shaped like a rod.

The heat pump 100 does not necessarily need to be installed in a vehicle. The heat pump 100 may be installed in other devices. The motor-driven compressor 10 may be used in an application other than the heat pump 100.

The circuit housing 32 and the inverter 30 may be mounted to other parts of the housing 11. For example, the circuit housing 32 and the inverter 30 may be mounted to the outer circumference of the side wall 14b of the first housing constituent 14 in the housing 11.

The shape of the circuit housing 32 is not limited to a tubular shape with a bottom. For example, the first housing constituent 14 may have a tubular circumferential wall that extends from the bottom wall 14a toward the opposite side from the side wall 14b. In this case, a plate-shaped cover is coupled to an open end of the circumferential wall, and the circumferential wall and the cover constitute the circuit housing. The accommodation chamber 34 is then defined inside the circuit housing.

Alternatively, a plate-shaped base member may be integrally attached to a hollow cylindrical base member with a bottom to form a circuit housing. In this case, one of the base members, which constitute the circuit housing, is coupled to the bottom wall 14a of the first housing constituent 14.

Figure 5:
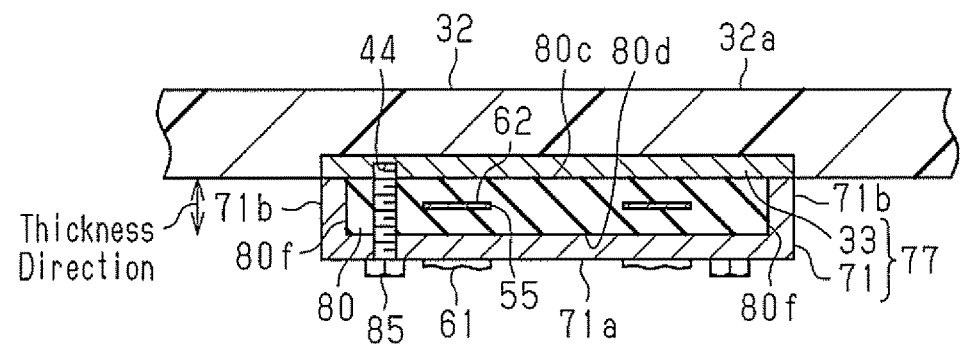
FIG. 5 is a cross-sectional view of a shield according to a modification.

The circuit housing 32 may include a plastic material and a metal plate as a shielding portion. In this case, the metal plate may be arranged on the inner surface or the outer surface of the circuit housing 32. The metal plate may be arranged inside the plastic material. For example, when the metal plate is arranged on the inner surface of the circuit housing 32, a metal plate 33 that functions as a shielding portion may be embedded in the bottom 32a that is made of a plastic material, as shown in FIG. 5.

When the metal plate is arranged on the outer surface of the circuit housing 32 or inside the plastic material, the metal plate faces the bus bars 55 (a communication lead) with the plastic material of the circuit housing 32 and the plastic portion 80 in between. Even in this case, the metal plate is electrically connected to the shielding member 71 to form the shield 77, and the shield 77 covers the bus bars 55 (a communication lead) from the inside of the accommodation chamber 34.

In the above-illustrated embodiment, the bottom 32a is electrically connected to the shielding member 71 with the metal fixing bolts 85. However, as long as the bottom 32a is electrically connected to the shielding member 71, its connection method may vary.

The bus bars 55 do not necessarily need to be integrated with the plastic portion 80 by molding as long as the bus bars 55 are insulated from the shielding member 71 and the circuit housing 32. For example, a tubular insulation member may surround the bus bars 55, and with the insulation member, the bus bars 55 are insulated from the circuit housing 32 and the shielding member 71.

Therefore, the present examples and embodiments are to be considered as illustrative and not restrictive and the invention is not to be limited to the details given herein, but may be modified within the scope and equivalence of the appended claims.

The invention claimed is:

1. A motor-driven compressor comprising:
a housing in which refrigerant is drawn;
a compression portion that is received in the housing and compresses and discharges the refrigerant;
an electric motor that is received in the housing and drives the compression portion;
a drive circuit that drives the electric motor;
a circuit housing that is arranged outside the housing and defines an accommodation chamber that receives the drive circuit;
a control circuit configured to control the electric motor by controlling the drive circuit;
a communication lead that is connected to the control circuit and drawn from the inside to the outside of the accommodation chamber; and
a metal shielding member that is arranged in the accommodation chamber and covers the communication lead, wherein
the circuit housing includes a metal shielding portion, which is electrically grounded,
the metal shielding member is electrically connected to the metal shielding portion,
the communication lead is a plate-shaped bus bar, which is integrated with a plastic portion by molding,
the plastic portion, which is integrated with the bus bar, is covered by the metal shielding member, and
the metal shielding member is fixed to the circuit housing with a fixing bolt that extends through the metal shielding member and the plastic portion.

2. The motor-driven compressor according to claim 1, wherein the fixing bolt is made of metal, and the metal shielding portion is fastened to the metal shielding member with the fixing bolt.

3. A motor-driven compressor comprising:
a housing in which refrigerant is drawn;
a compression portion that is received in the housing and compresses and discharges the refrigerant;
an electric motor that is received in the housing and drives the compression portion;
a drive circuit that drives the electric motor;
a circuit housing that is arranged outside the housing and defines an accommodation chamber that receives the drive circuit;
a control circuit configured to control the electric motor by controlling the drive circuit;
a communication lead that is connected to the control circuit and drawn from the inside to the outside of the accommodation chamber; and
a metal shielding member that is arranged in the accommodation chamber and covers the communication lead, wherein
the circuit housing includes a metal shielding portion, which is electrically grounded,
the metal shielding member is electrically connected to the metal shielding portion,
the metal shielding member includes a rectangular plate-shaped body and plate-shaped side walls that extend from edges in a transverse direction of the body,
the metal shielding portion is arranged to face the communication lead, and
ends of the side walls that are located on an opposite side from the body are connected to the metal shielding portion.

4. The motor-driven compressor according to claim 3, wherein
the communication lead is a plate-shaped bus bar, and
the bus bar is integrated with a plastic portion by molding.

5. The motor-driven compressor according to claim 4, wherein
the plastic portion, which is integrated with the bus bar, is covered by the metal shielding member, and
the metal shielding member is fixed to the circuit housing with a fixing bolt that extends through the metal shielding member and the plastic portion.

6. The motor-driven compressor according to claim 5, wherein the fixing bolt is made of metal, and the metal shielding portion is fastened to the metal shielding member with the fixing bolt.

7. The motor-driven compressor according to claim 3, wherein the metal shielding portion is fastened to the metal shielding member with a metal fixing bolt.

8. A motor-driven compressor
- a housing in which refrigerant is drawn;
- a compression portion that is received in the housing and compresses and discharges the refrigerant;
- an electric motor that is received in the housing and drives the compression portion;
- a drive circuit that drives the electric motor;
- a circuit housing that is arranged outside the housing and defines an accommodation chamber that receives the drive circuit;
- a control circuit configured to control the electric motor by controlling the drive circuit;
- a communication lead that is connected to the control circuit and drawn from the inside to the outside of the accommodation chamber; and
- a metal shielding member that is arranged in the accommodation chamber and covers the communication lead, wherein
- the circuit housing includes a metal shielding portion, which is electrically grounded,
- the metal shielding member is electrically connected to the metal shielding portion, and
- the metal shielding member is arranged between the drive circuit and the communication lead.

9. The motor-driven compressor according to claim 8, wherein
- the communication lead is a plate-shaped bus bar, and
- the bus bar is integrated with a plastic portion by molding.

10. The motor-driven compressor according to claim 9, wherein
- the plastic portion, which is integrated with the bus bar, is covered by the metal shielding member, and
- the metal shielding member is fixed to the circuit housing with a fixing bolt that extends through the metal shielding member and the plastic portion.

11. The motor-driven compressor according to claim 10, wherein the fixing bolt is made of metal, and the metal shielding portion is fastened to the metal shielding member with the fixing bolt.

12. The motor-driven compressor according to claim 8, wherein the metal shielding portion is fastened to the metal shielding member with a metal fixing bolt.

* * * * *